United States Patent [19]

Bloch et al.

[11] Patent Number: 4,677,734

[45] Date of Patent: Jul. 7, 1987

[54] ROBOTIC WIRE HARNESS ASSEMBLY SYSTEM

[75] Inventors: Joseph T. Bloch; Dan A. Cross, both of Seattle, Wash.

[73] Assignee: The Boeing Company, Seattle, Wash.

[21] Appl. No.: 741,318

[22] Filed: Jun. 4, 1985

Related U.S. Application Data

[63] Continuation-in-part of Ser. No. 539,768, Oct. 7, 1983, Pat. No. 4,520,966.

[51] Int. Cl.⁴ .................................................. H01R 43/00
[52] U.S. Cl. ................................... 29/564.2; 29/33 M; 29/563; 29/564.6; 29/755; 29/868
[58] Field of Search ........... 242/54 R; 29/33 F, 33 K, 29/33 M, 563, 564, 564.2, 564.6, 745, 755, 757, 742, 868

[56] References Cited

U.S. PATENT DOCUMENTS

| | | | |
|---|---|---|---|
| 3,842,496 | 10/1974 | Mercer | 29/564.6 |
| 3,895,762 | 7/1975 | Fletcher, Jr. et al. | 242/54 R |
| 4,029,006 | 6/1977 | Mercer | 101/35 |
| 4,033,386 | 7/1977 | Wood | 29/755 |
| 4,433,479 | 2/1984 | Suzuki et al. | 29/564.6 |
| 4,520,966 | 6/1985 | Bloch et al. | 901/7 |

*Primary Examiner*—Gil Weidenfeld
*Assistant Examiner*—Daniel W. Howell
*Attorney, Agent, or Firm*—John C. Hammar

[57] ABSTRACT

Wire harnesses are automatically fabricated with pre-cut and preconfigured ends in a robotic wire harness assembly system including a wire preparation subsystem, a wire reeling subsystem, a wire terminating subsystem, a wire queuing subsystem, a layup subsystem, associated robots, and a logic controller.

12 Claims, 10 Drawing Figures

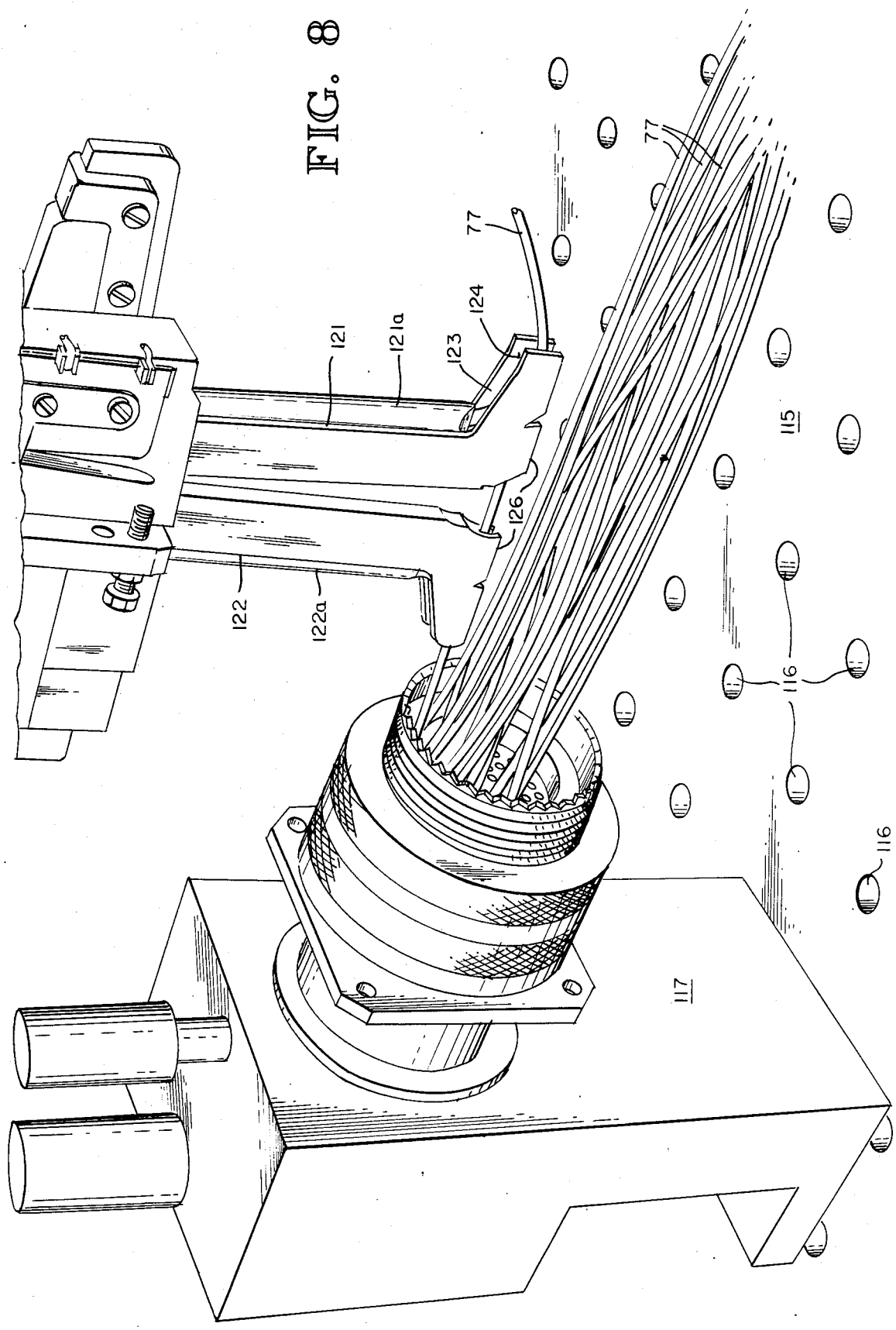

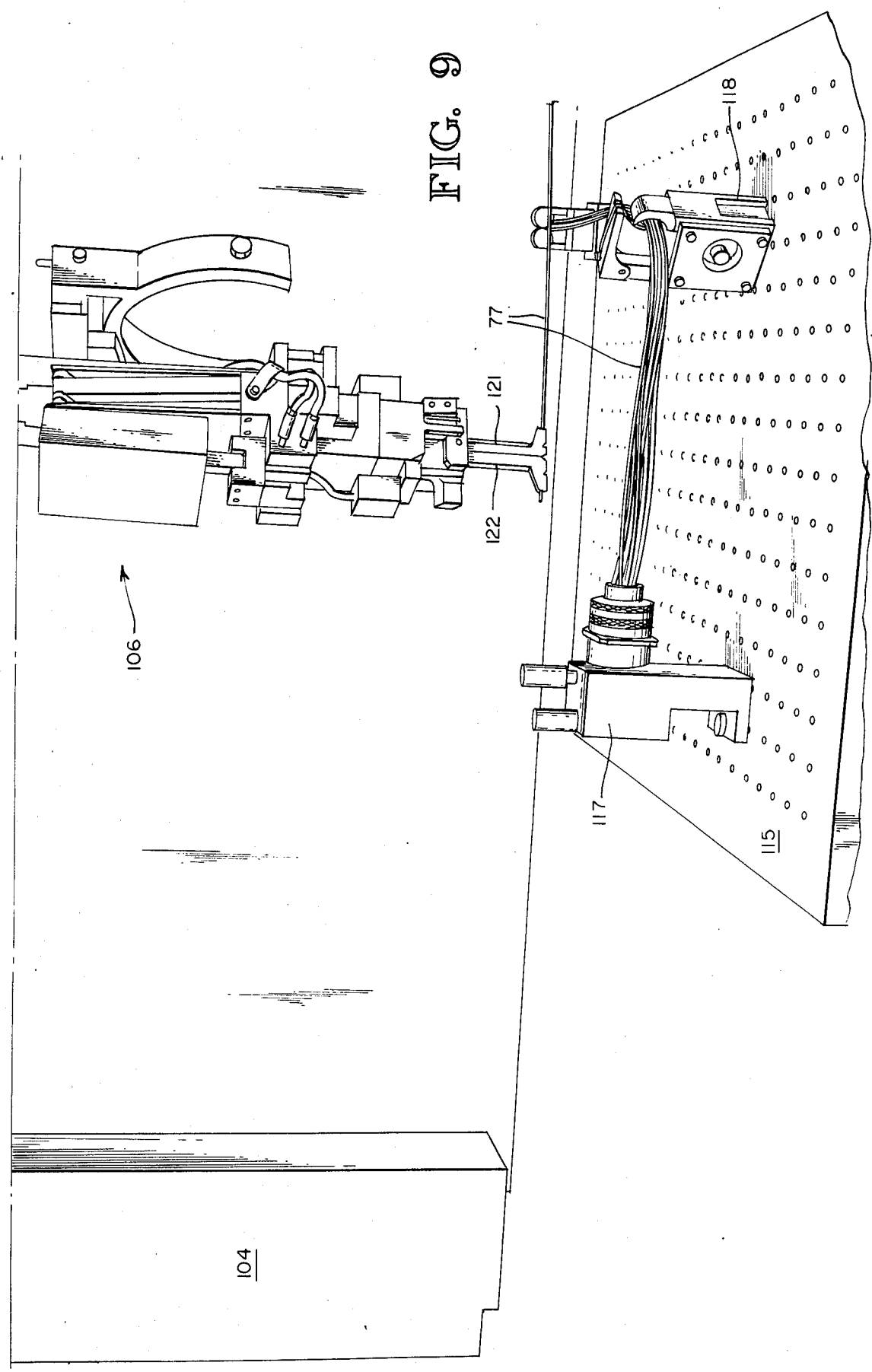

ROBOTIC WIRE HARNESS ASSEMBLY SYSTEM

GOVERNMENTAL RIGHTS:

The United States Government has rights in this invention pursuant to Contract No. DAAH01-82-D-0013 awarded by the U.S. Army.

REFERENCE TO RELATED APPLICATION

This application is a continuation-in-part application based upon U.S. Ser. No. 539,768, filed Oct. 7, 1983, now U.S. Pat. No. 4,520,966, issued June 4, 1985.

TECHNICAL FIELD

The present invention relates to robotics, and, more particularly, to the robotic assembly of electrical wire harnesses using flexible automation.

BACKGROUND OF THE INVENTION

A robot is a reprogrammable multi-functional manipulator designed to move material, parts, tools, or specialized devices to perform a variety of tasks. Contemporary industrial robots are helping to reduce human drudgery in manufacturing plants throughout the world, to improve productivity, and to reduce manufacturing costs. Robots can be trained to perform complex and tedious jobs. Through the use of sensors and adaptive controls, robots can even cope with changing conditions in the workplace.

To assemble a wire harness, a robot must be able to sense the ends of the wire. With this in mind, it is important that any auxiliary equipment facilitating robotic assembly be able to position the ends of the wire in predictable locations where the robot manipulator may grip the wire.

While it is possible to build machines which will assemble a single type of wire harness in a single configuration, the cost of such machinery is prohibitive for assembly of small lots of different wire harnesses. These dedicated, single task machines do not need to use robots. There is a need for a flexible system with flexible automation to make wire harnesses in small lots while allowing ease of reconfiguration to produce a variety of wire harnesses. Robotic assembly provides this flexible approach.

Most wire harness machines rely heavily on manual labor to configure the harnesses insomuch as the machines layup the wires and bind them, but do not complete the ends. Only after being bundled are the ends of each wire configured. Such an operation is prohibitively expensive when the demand for a particular harness is relatively large. Even with dedicated machines for layup, the configuring of ends of the harnesses is generally done manually.

Summary of the Invention

Robots are used to assemble electrical wire harnesses using wire segments cut to length and configured prior to bundling. The robotic assembly of the wire harness is facilitated through the use of specialized devices or tools which make it easier for the manipulator of the robot to handle the individual wire segments The primary goal of the present invention is a flexible system which can be easily reprogrammed to produce a variety of wire harnesses, usually in small lots. With robots and associated microprocessors and/or computers, the specifications for a wire harness can be input into the system manually or with CAD equipment and can be converted to control data to activate robots to assemble the harness. The robot control preferably is achieved through a Data Generator control program running on a computer with downloaded control data passing to the internal systems controller (CPU or microprocessor) of each unit in the system. The only significant manual tasks which remain are the lay-out of the proper form board configuration (i.e., positioning the turn gates and connector blocks) and the resupply of materials to the various machines. Manual override of the system or any subsystem is possible Wire is de-reeled, cut, and marked in the Wire Preparation subsystem using a commercial wire marker. From the wire marker, the cut/marked wire (having a length of about 8 inches to 10 feet) is loaded into a canister in a work bay of the Wire Reeling subsystem. A robot connecting the Wire Termination subsystem with the Wire Reeling subsystem picks up the loaded canister containing the wire segment (with both ends exposed) and configures each end (in a pin, lug, or other termination) as required for the particular harness under construction. The canister is, then, placed in a bay of the Queuing subsystem where it is available to a layup robot in the Wire Layup subsystem. The robot inserts one end of the wire into a connector on a layup form board, and the wire is routed through gates to control shape. The second end is then inserted into another connector. The empty canister is returned to the Queuing subsystem and, subsequently, to the work bay of the Wire Reeling subsystems, and the process for handling each wire continues until the harness is complete. The layup robot, using a variety of tools, completes all required operations including "tie wrapping."

Brief Description of the Drawings

FIG. 8 is an isometric of a routing tool on the layup robot manipulator and a connector block positioned on a form board.

FIG. 9 is another isometric of the layup robot, form board, and tools.

BEST MODE CONTEMPLATED FOR CARRYING OUT THE INVENTION

Figure 1A:
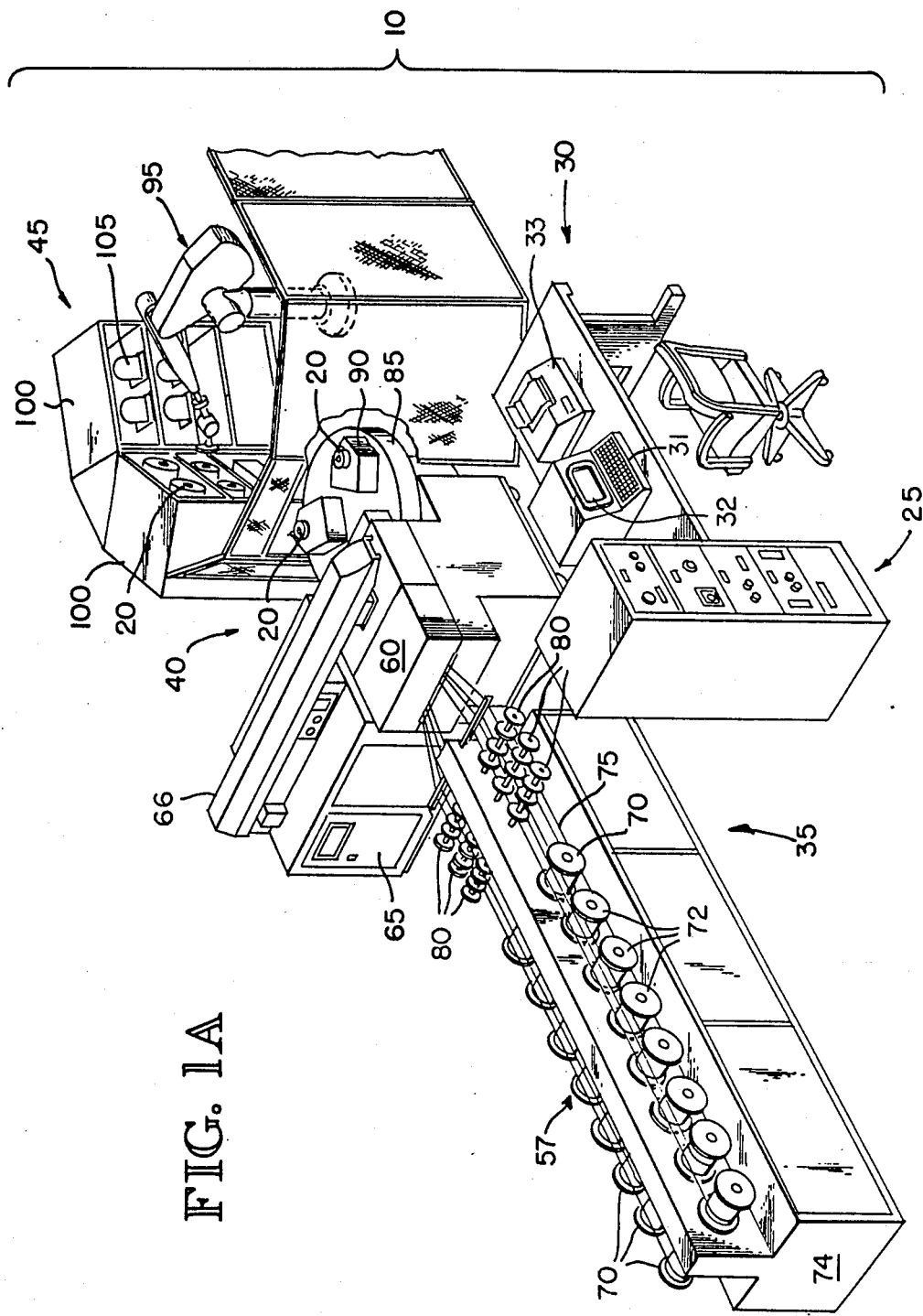
FIGS. 1A and 1B show a robotic wire harness assembly system of the present invention.

A wire segment as used herein is a wire having an arbitrary but known length. The type, diameter, and terminal end configuration (e.g., connectors, trimmed length, tinned ends, etc.) of the wire may vary.

A robotic wire harness assembly system 10 is an integrated combination of hardware and software capable of performing the task of producing an electrical wire harness 15. Data necessary for controlling each subsystem of the system 10 is generated in an off-line computer, and is transmitted from the computer to a control system 30, (including a master system computer 25, data input devices, (such as a keyboard 31), and data output devices (such as a CRT 32 and printer 33)) that supplies control data to a Wire Preparation subsystem 35, a Wire Reeling subsystem 40, a Wire Termination subsystem 45, a Wire Queuing subsystem 50, and a Wire Layup subsystem 55.

The master system computer 25, preferably an INTEL 86/380 segmented into six internal computers (as will be explained), converts input engineering data from the VAX data generator computer and keyboard 31 into processing commands required to operate the assembly system components in the several subsystems to assemble a prescribed harness. The control commands are distributed to the appropriate subsystem controllers (which command and monitor each step of the harness assembly process). The input and output devices included with the control system 30 allow the operator to communicate with the subsystems to directly control the sequence of activity in the system 10, to input additional commands manually, or to override the data generator input or master system computer.

Figure 5:
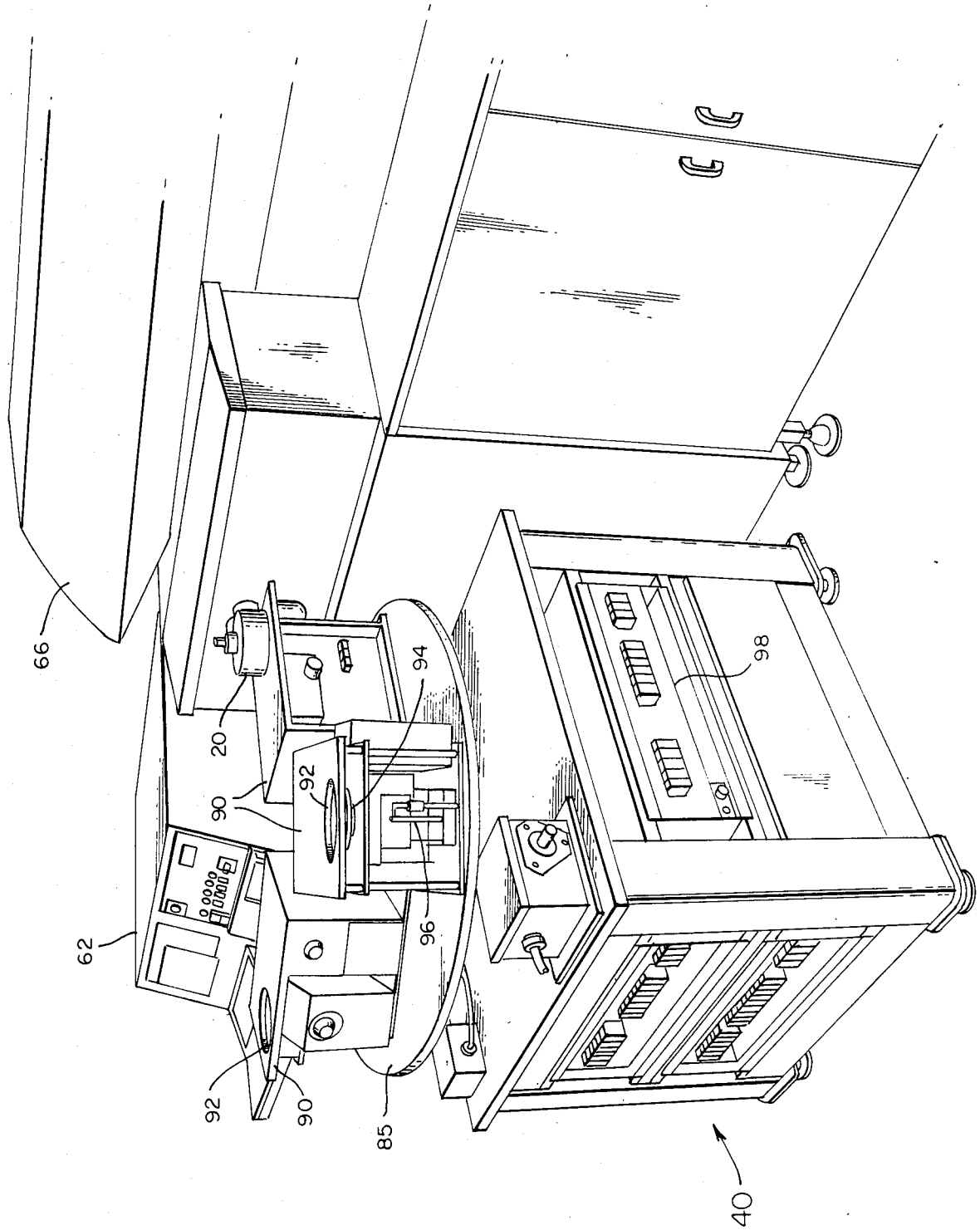
FIG. 5 is an isometric of the Wire Reeling subsystem.

The Wire Preparation subsystem 35 uses a commercial WESTLAND Laser Cable Marking System, to mark and cut wire segments. The system includes a wire de-reeling station 57, a marker/cutter unit 60, and a control computer 62, FIG. 5. Generally a slave to the master system computer, the control computer allows direct control of the subsystem, if desired. The wire de-reeling station 57 holds a plurality of wires of different dimension on several, replaceable wire reels or spools 70, and allows selection of the desired wire by the marker/cutter unit 60. The spools 70 are journaled on through shafts 72 extending through the base 74 of the de-reeling station 57. Wires 75 are tensioned by a series of idler and tensioning pulleys 80 on the base 74 and are pulled to the marker/cutter 60 by a positive feed drive rollers (not shown) in the unit 60. The WESTLAND marker/cutter unit 60 also includes an alignment system for drawing a selected wire into the drive rollers, a laser 66 of suitable power, and associated control and targeting equipment (not shown) to print identification markings on the wire. A guillotine blade actuator (not shown) cuts the continuous wire into wire segments. Due to bends in the harness, each wire has a unique length. The system automatically adjusts the length in accordance with the input data to produce the wires needed to complete the harness. In short, the wire preparation subsystem 35 selects, marks, measures, and cuts the wire 75 while feeding cut segments 77 into the Wire Reeling subsystem 40.

The alignment system for the WESTLAND laser cable marking system includes a plurality of feed sheaves or pulleys on the infeed side of the system to allow selection between one of the different wires. One wire extends to the mouth of the machine on each sheave. When selected, the chosen sheave moves inwardly to slide a predetermined length of wire into the machine. Once within the machine, the drive rollers automatically move to sandwich the selected wire and pinch upon it. When driven in opposite directions by a suitable belt drive, the rollers draw in the necessary length of wire from the reel 70 on the base 74 of the de-reeling station 57.

The laser 66 marks each wire segment 77 with the proper mil spec or other written designation for that wire in the bundle to allow ease of servicing thereafter. The marks are "burned" into the insulative coating in a dot matrix fashion.

The Wire Reeling subsystem 40 controls the loading of each wire segment 77 into the wire canister 20 as the wire 75 exits from the Wire Preparation subsystem 35. The Wire Reeling subsystem 40 has a rotatable table 85, similar to an automated "lazy susan," providing several stations or bays 90 for holding a wire canister 20. One bay is presented to the Wire Preparation system 35 for receiving a wire segment 77, and the other two are within reach of a MERLIN robot 95 by American Robots for further processing of the wire. The two bays 90 within reach of the robot 95 provide one location for an incoming empty canister and one location for an outgoing loaded canister. Of course, additional stations 90 might be used, depending on the speeds of various operations.

Each station or bay includes an open receiving well 92 (FIG. 5) of slightly greater diameter than the diameter of a canister 20 for holding the canister securely in a recess. In response to control data from the master system computer 25, through an OPTO 22 interface 98, a turntable 94 within each station 90 revolves to turn the operating parts of the canister 20 and to draw each wire segment 77 in a predetermined, accurate, and reproducible manner from the marker/cutter 60 into the canister. The canister serves as a convenient carrier for the robot 95 to configure the wire in the Wire Termination subsystem.

A drive lug on the turntable contacts a pin extending downwardly from the bottom plate 135 of the canister 20 to allow linked rotation of the plate 135 in response to rotation of the turntable 94. The turntable can be revolved at a known, constant, and controllable speed to draw wire into the canister. As the lead end exits the Wire Preparation subsystem, it enters the rim chuck assembly 145, feeds through the canister, and exits the center chuck assembly 140. It then enters a positioning funnel below the turntable. At a predetermined distance into the funnel, the wire trips a microswitch to activate a solenoid to move a pneumatic or hydraulic ram 96 upwardly to trip a spring-biased latch or trigger 315 on the underside of the canister adjacent the center chuck assembly 140. Once tripped, the jaws of the chuck spring closed to grip the wire segment 77 (as will be explained). Then, the turntable begins to revolve. Simultaneously, a control signal is transmitted to the marking system to allow wire to be reeled into the canister.

The length of wire transferred (usually about 5–10 feet) is monitored and when the proper length has been received onto the reel the turntable stops revolving and the trailing end of the wire is locked into the rim chuck 145, again, with a spring-loaded trigger 315.

The Wire Termination subsystem 45 includes a MERLIN robot 95 of conventional design, which swivels between the canister table 85, equipment racks 100 filled with conventional wire termination device 105 adapted to be used with a loaded wire canister 20, and bays 102 of a Queuing subsystem 50 for the IBM layup robot 110.

"Termination" or "configuring " is defined as trimming, stripping, and/or tinning the ends of the wire segment 77, installing an electrical lug, and/or the crimping of an electrical contact onto one or both of the ends of the wire segment 77.

The MERLIN robot 95 picks up a loaded canister 20 from the table 85 at the Wire Reeling subsystem 40 and presents either the leading end or the trailing end of the wire segment 77 to the appropriate termination device 105. After both wire ends are properly terminated or configured, the robot 95 places the canister 20 in a receiving bay 102 of the Wire Queuing subsystem 50, releases the canister, picks up an empty canister from another bay 102, and returns to the Wire Reeling subsystem. Since the robot 95 can pick up a loaded canister 20, the robot 95 can readily acquire the ends of the wire segment 77 or can easily present the ends of the wire segment 77 to a desired termination device 105.

Figure 6:
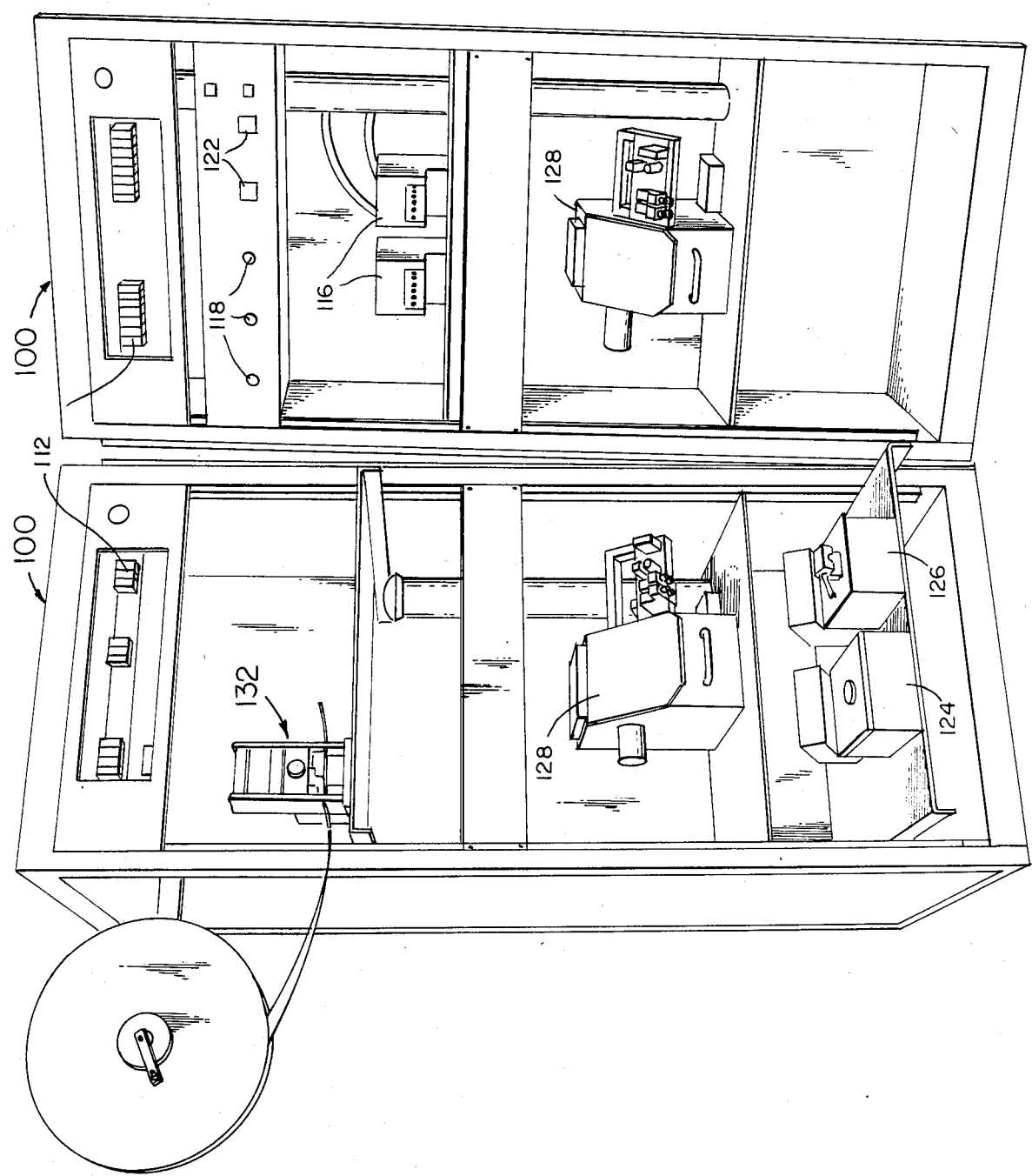
FIG. 6 is an isometric of the Wire Termination subsystem.

Equipment to configure the ends of each wire segment is controlled with an OPTO 22 electrical interface module 112 (FIG. 6) mounted in each rack 100 of the Wire Termination subsystem. Each end is initially trimmed with a ram blade pneumatic actuator 122 to make the wire segment a precise, predetermined length. A 480 Auto Stripper 116 available from Design, Duggy & Mercer, Inc. of Inglewood, California automatically strips the wire when the end is presented in the proper funnel by the robot 95. Carpenter Model 25-C wire twisters 118 from Carpenter Mfg. Co., Inc. of Manlius, New York wrap the exposed wire conductor ends. A ULTRA-DIP solder machine 124 from Tooltronics, Inc. of Glendale, California allows automatic tinning and a fluxing machine 126 may also be used. Contact crimps may be applied with a crimper 128 from TRI-STAR ELECTRONICS, INC., and end connectors may be applied with a dispenser 132 from AMP, Incorporated. The MERLIN robot 95 is trained to know the location of each configuring device 105 on the racks 100 and presents the wire ends to the various devices as needed.

The Wire Queuing subsystem 50 has several bays 102 mounted on the framework 104 for the layup robot 110, such as an IBM 7565, in the Wire Layup subsystem 55. This robot is suited for laying up each wire of the harness since its manipulator 106 moves in the half space above the form board 115. The manipulator 106 can easily and conveniently position the wire in the layout plane without interference. That is, the planar coordinate systems defined by the robot framework plane and form board 115 are readily mapped by the manipulator 106 moving a known distance above the form board 115.

Upon command from the master system computer, each bay 102 revolves into position where the layup robot 110 can pick up the canister to dispense the wire segment 77 in a preprogrammed course over the form board 115 to generate the desired wire harness 15. With associated tools mounted to the form board, the robot 110 secures the ends of the wires in the desired manner, lays out the harness bundle, and ties the individual segments of wire together in the bundle to complete the harness. After a Wire Segment has been dispensed from the canister 20, the robot 110 places the empty canister 20 into an empty bay 102 of the wire queuing subsystem 50 where it can be picked up by the MERLIN robot 95 for return to the Wire Reeling subsystem.

The form board 115 comprises a rectangular surface having a regular array of spaced holes 116 (FIG. 8) to define a grid work to mount the tools used for the accurate layup of a wire harness. Several tools may be inserted at predetermined locations in the form board to define the major characteristics of the wire harness. Most notably, a connector block 117 can be positioned on and locked to the form board to receive the end of wire segments 77 in the harness. Turn gates 118 (FIG. 9), which allow bends to be constructed into the harness before tieing the wires together and as each wire is laid up, include a receiving slot that positions each new wire in a precisely defined, predetermined location so that predetermined lengths of wire may be precut and preconfigured, and yet the robot 110 can automatically complete the laying up of the wires. That is, the robot 110 can travel along one path several times to position one wire each time into its unique position in the wire harness bundle.

The IBM layup robot 110 has an arm 106 for holding a work tool 119 to route the wire to the various tools on the form board by pulling segments from the canister and/or by acting as a guide for the wire as the robot manipulator moves over the board. A preferred wire routing tool 119 (FIGS. 8 and 9) includes two legs 121 and 122 with a wire guide in a longitudinal slot formed in each leg. The legs 121 and 122 can be moved independently of each other (FIG. 8), and the portions 123 and 124 of each leg on opposite sides of the slot can also be moved independently from each other. The legs and slot define a plane in which the wire 77 extends. For purposes of discussion, since the manipulator defines the Z-axis, this plane can be considered to be an X-Z plane. Wire can be moved through the tool in the X-direction, clamping the wire with one leg 121, and bringing the legs together, or in the X-Y plane by moving or turning the tool. By releasing the first leg 121 and clamping the second leg 122, the wire can be held while the legs are spread again. Clamping is achieved with two movable rods 121a and 122a fitted with friction feet which are associated with the legs 121 and 122. The rods are movable in the Z-direction. Since these rods form the upper port of the wire channel, by being moved upwardly or downwardly, they release or clamp the wire. A lip 126 at the end of each leg portion retains the wire between the portions 123 and 124 below the rods 121a and 122a. In this way, the wire is secure on the Z-direction, held by the robot, but is free to move on the X-Y plane under the guidance of the legs or the movement of the robot manipulator arm 106.

A tie gun tool may be used to wrap and to tie the bundled wires, or the tieing operation may be done manually.

Figure 1B:
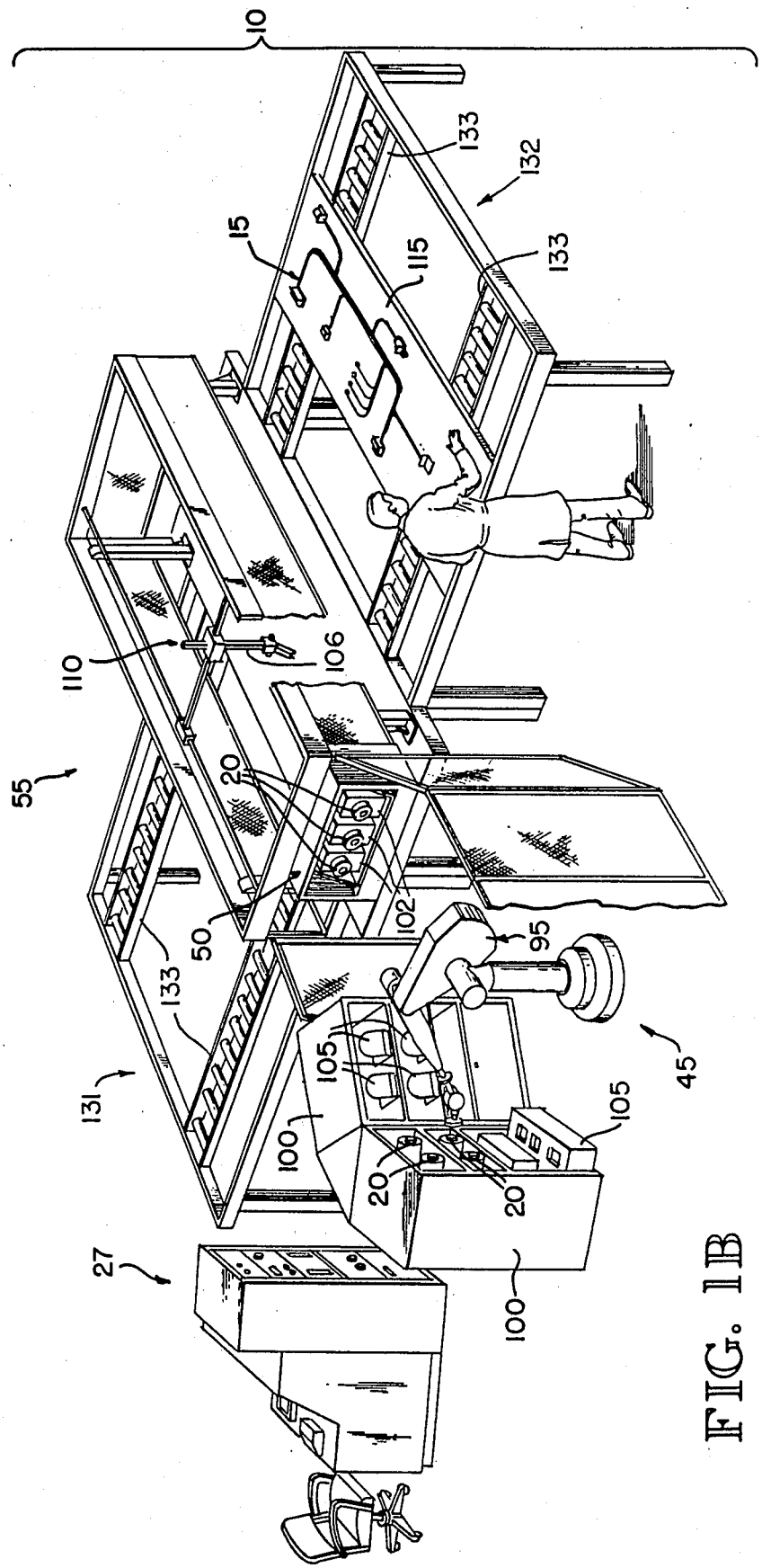

The layup subsystem preferably includes a preparation station 131 (FIG. 1B) on one side of the IBM robot 110 where a form board can be set up, and an unloading station 132 on the other side of the robot where the assembled harness 115 can be removed from the board. The preparation and unloading stations 131 and 132 are connected with rollers 133 or other conveyor means which allow easy movement of the form board 115 from the preparation station 131 to the robot 110 and on to the unloading station 132. A form board can be set up and positioned in the robot for automatic assembly of a wire harness. During assembly, a second form board can be set up and be readied for insertion into the layup robot. Upon completion of the first harness, the set up form board can replace the first form board, which will then be moved into the unloading station 132. Then, as the second wire harness is assembled, the first complete harness can be unloaded, and the form board readied for reuse. Preparation and unloading can oscillate between the two side of the robot.

Figure 2:
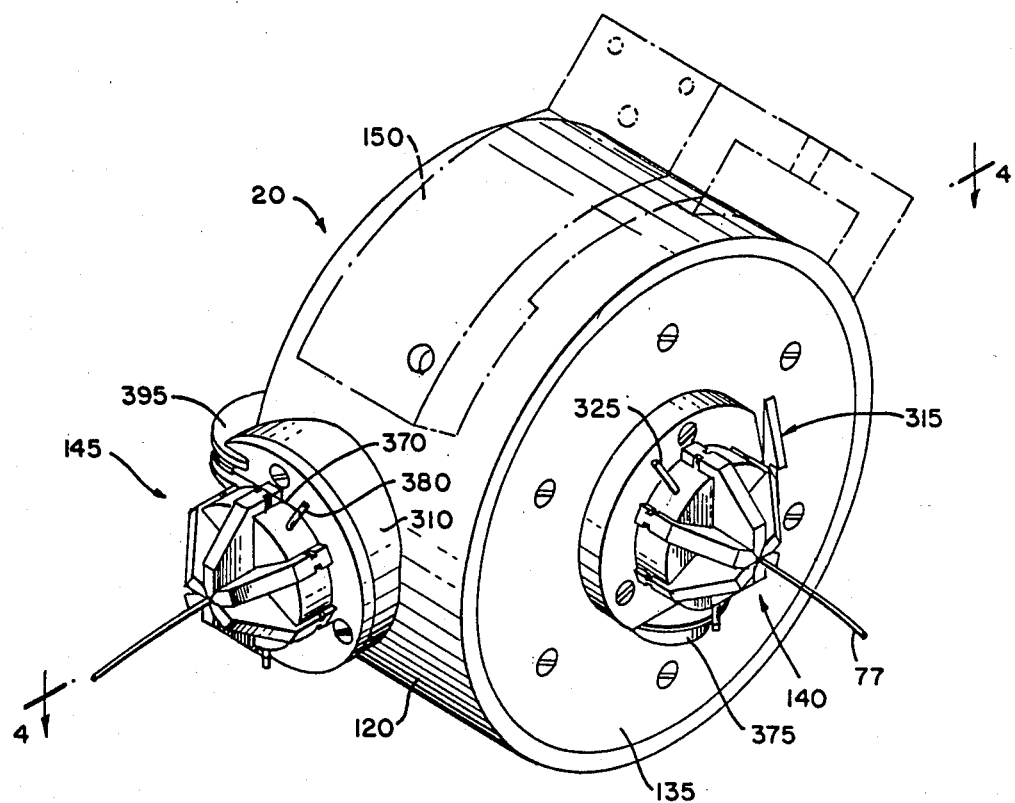
FIG. 2 is a detailed isometric of a preferred wire canister used to transport a wire in the system.
Figure 3:
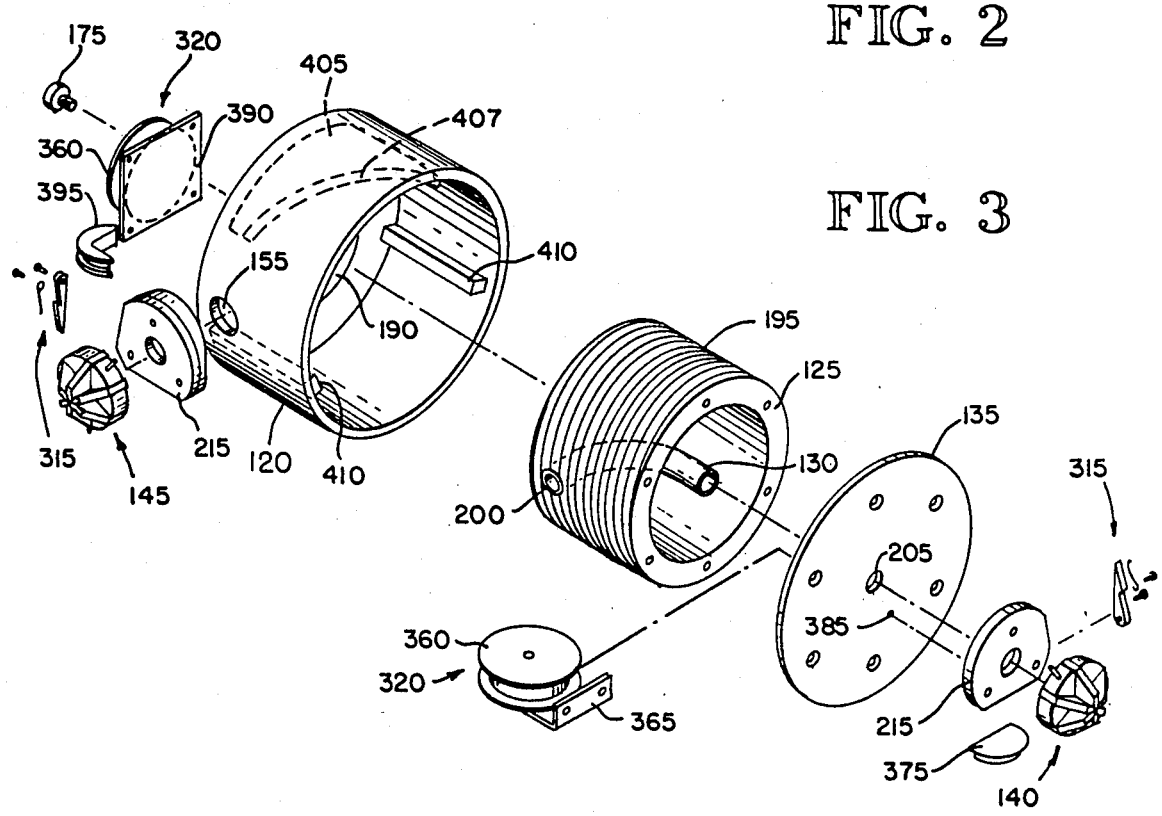
FIG. 3 is an exploded view of the canister of FIG. 2.
Figure 4:
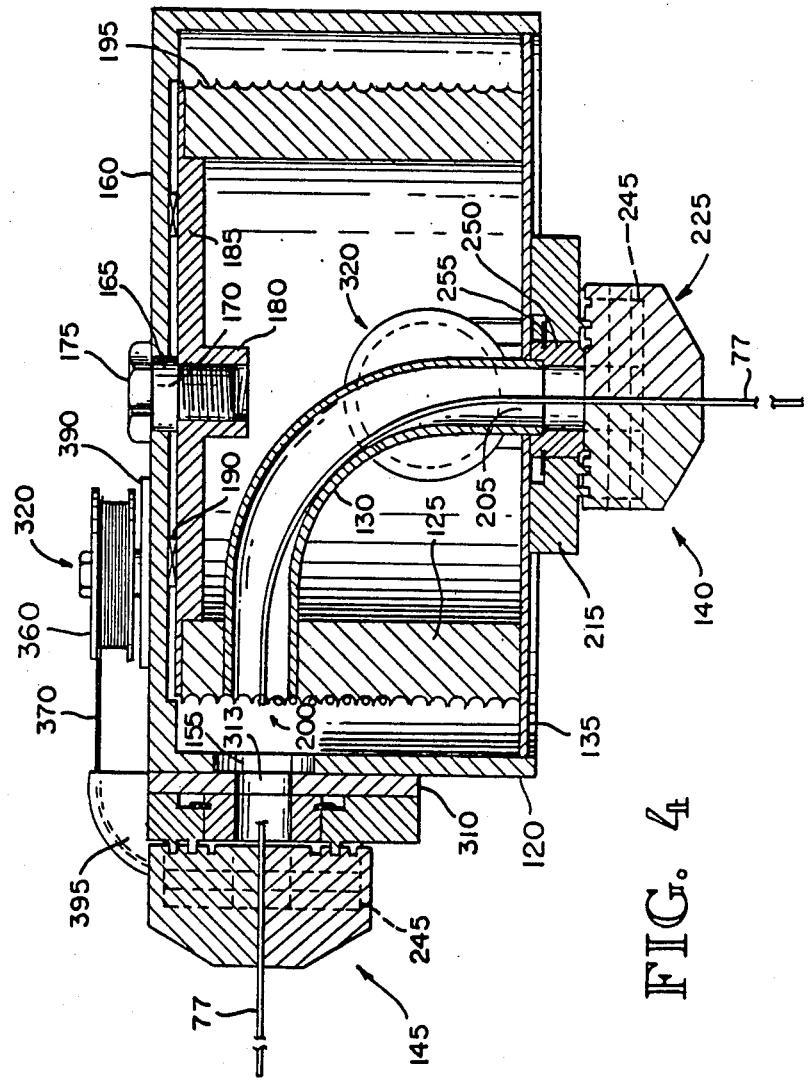
FIG. 4 is a sectional view taken generally along line 4—4 of FIG. 2.

As described in U.S. Pat. No. 4,520,966 and as shown in FIGS. 2, 3, and 4, the wire canister 20 includes a housing 120, a cylindrical drum 125, a 90° elbow shaped wire guide tube 130, a rotatable drive plate 135, a center chuck assembly 140, and a rim chuck assembly 145 for clamping and centering the ends of a wire segment, thereby facilitating the acquisition of the ends by the robots. A robot adapter mount 150 may be used on the canister to facilitate grasping of the canister by a robot.

The housing 120 is a cylindrical shell having an access opening 155 allowing a wire to enter the canister. A cover plate 160 integral with the housing includes a bore adapted to receive a sleeve 165 that carries a rotatable bolt 170. The bolt is received and affixed in a socket 180 formed in an end plate 185 attached to the drum 125. A needle bearing 190 is juxtaposed between the cover plate 160 and the end plate 185, thereby enabling the drum to rotate with respect to the housing. The wire is wound upon the periphery of the drum guided by helical thread or a groove 195. An inlet opening 200 in the drum allows insertion and passage of a wire through the drum.

The drive plate 135 on the drum 125 is adapted to rotate within the housing 120. The drive plate has a wire outlet opening 205 allowing the leading end of the wire to exit from the drum. Disposed and affixed within the drum 125, a 90° elbow shaped wire guide tube 130 extends from the inlet opening 200 to the outlet opening 205 where it is attached to the drive plate 135. The guide tube 130 accepts the leading end of the wire and guides it to the outlet opening 205 whereafter the leading end of the wire is inserted into and centered within the center chuck assembly 140.

The center chuck assembly 140 and the rim chuck assembly 145 both include a scroll plate, a chuck, and a plurality of slidable jaws.

Rotation of the chuck with respect to the scroll plate 215 effects either a closing or an opening of a chuck assembly.

The chuck assemblies both include a releasable mechanism for latching the chuck to prevent a rotation of the chuck and a biasing mechanism for rotating the chuck after the chuck is unlatched.

The latching mechanism for the center chuck assembly 140 comprises a latch pin 325 attached to the chuck 220, a pivotable latch 330, and a biasing spring 335. The pin 325 is mounted in and extends radially outwardly from the cylindrical head of the chuck. The latch is provided with a ramp surface 340 and is pivotably attached to the scroll plate 215 with a pin 355. The latch 330 is provided with a detent 350 and is biased towards the pin by means of the spring 335 appropriately fastened to the scroll plate.

In use, the chuck 220 may be rotated relative to the scroll plate 215 to open the jaws. Concomitantly, the pin is rotated to a position wherein it contacts the ramp surface and moves the latch against the force of the spring until the pin is received in the detent. The biasing mechanism attempts to promote rotation of the chuck in the direction which is constrained by the latching mechanism.

The biasing mechanism 320 for the center chuck assembly includes a reel 360, a mount for the reel 365, a line 370 which may be wound onto the reel, an arcuate line guide 375, and a post 380 for fastening an end of the line. The reel is rotatably mounted upon the mount disposed within the drum and attached to the drive plate. The reel is biased by an internal spring to cause it to rotate in a predetermined direction. A line may be wound upon the reel so that if the line is played out from the reel, the spring-biased reel provides an opposite tensile force to urge the line to be rewound upon the reel. One end of the line passes through a bore in the drive plate and is directed by the line guide, affixed to the surface of the scroll plate of the center chuck assembly, to the post that is affixed to and extends radially outwardly from the chuck.

When the chuck of the center chuck assembly is rotated, the jaws will be urged from the closed portion to the open position. At the same time, the line will be unwound from the reel. Under the urging of the spring-biased reel, the line will tend to urge the chuck to rotate in an opposite direction and, if unlatched, the chuck would rotate back to the closed position. Upon sufficient rotation of the chuck with respect to the scroll plate, the pin will contact and depress the ramp surface of the latch, so that the pin will fall into the detent.

To unlatch or close the chuck assembly, to release the chuck, and to urge the jaws to the closed position (whereby the leading end of a wire may be constrained), the latch 320 is depressed by the ram of the Wire Reeling subsystem to release the pin 325 from its secured position within the detent 350. The line will be rewound automatically, rotating the chuck to close the jaws.

For the rim chuck assembly, the reel 360 is mounted upon a flat mounting plate 390 affixed to the cover plate 160 of the housing, and the line 370 is trained by a right-angled line guide 395 affixed to the cover plate.

At the start of the wire loading process, the chucks of both assemblies are open. The drum 125 is rotated to align the inlet opening 200 with the access opening 155.

Rotation of the drum is commenced with the turntable to draw additional wire into the canister 20. A wire feed guide bar 405 having an arcuate edge 407 leading away from the inlet opening 155 is affixed to the interior of the housing. A pair of wire retaining blocks 410, affixed along the interior of the housing and disposed proximate the groove, prevent the wire from escaping the groove and jamming the canister. The length of the wire being wound upon the drum may be monitored (by a rotation sensor) and measured against the length of wire indicated by the Wire Preparation subsystem as having been fed to the wire canister. The end of the wire is cut to the desired length and the rotation of the drum is stopped leaving the trailing end of the wire segment 77 extended through and centered within the rim chuck assembly 145.

Excess wire extending from and centered within each chuck assembly may be trimmed to a desired precise length from each of the chuck assemblies in the Wire Termination subsystem.

Figure 7:
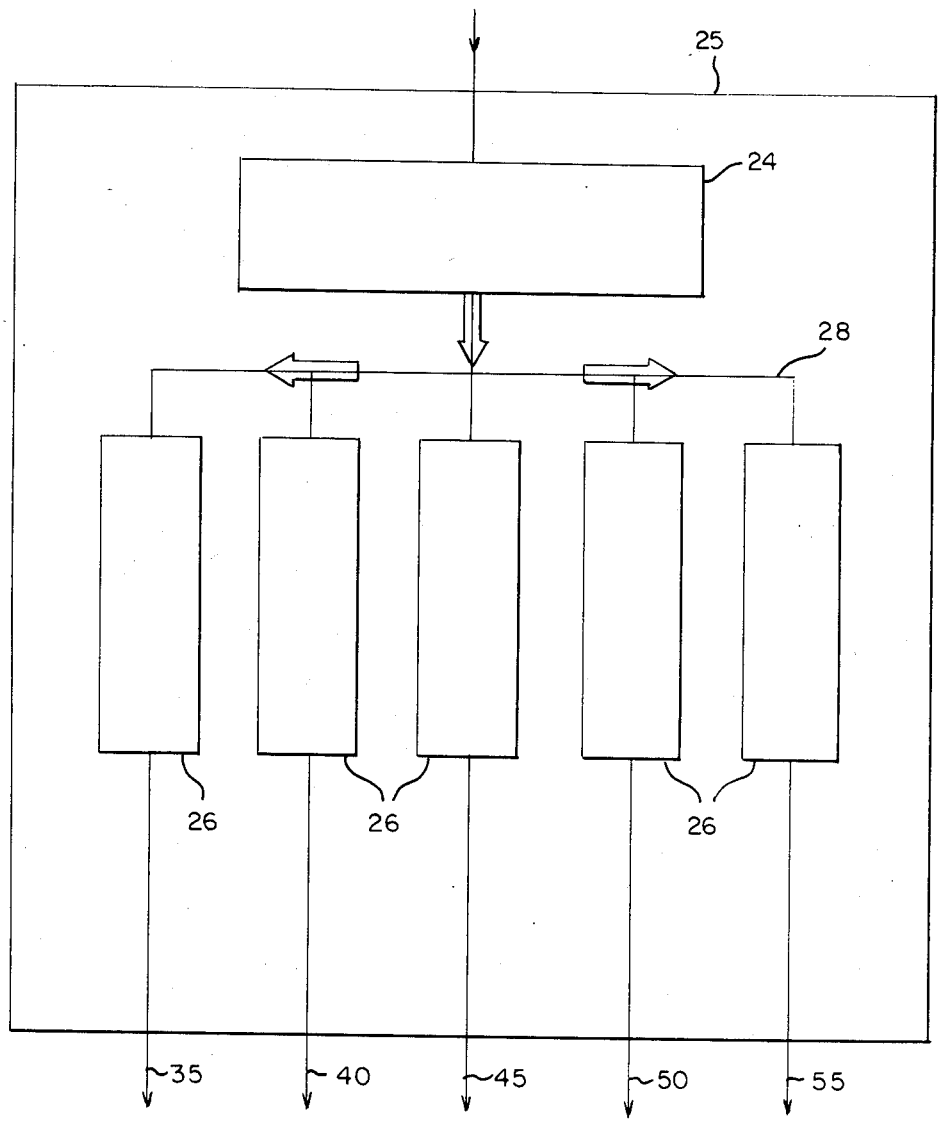
FIG. 7 is a schematic representation of the master system computer

While system control can be provided manually with the input devices of the master system computer 25, preferably the assembly will be controlled directly from CAD equipment used to design the particular wire harness of interest and with a dedicated computer which manages and supervises the various tasks. CAD data will be processed in a VAX 11/780 computer through interface software, first, to convert the CAD data with generic and specific software into the engineering data needed to define all the tasks that the robots must undertake. For example, the wire size length, and configuration of each wire must be specified. The shape and type of harness must be defined so that a proper form board and robot path can be established. The robots must know which reel on the wire de-reeling system holds which size wire. Finally, the assembly order must be known. This and other data is produced in the VAX Data Generator Computer, and is fed to the INTEL 86/380 master system computer 25, where a manager 24 (FIG. 7) of the computer (an 86/30 single board computer) will buffer the data and will distribute the appropriate data to five supervisors 26 (88/25 single board computers) through an appropriate multibus 28. Each supervisor is linked to a separate subsystem of the harness assembly system, namely, the Wire Preparation subsystem 35, the Wire Reeling subsystem 40, the Wire Termination subsystem 45, the Wire Queuing subsystem 50, and the Wire Layup subsystem 55. The supervisors 26 convert the data into command signals which can be interpreted by the microprocessors/computers of the various subsystems. For example, the Cable System Control Code is written in Fortran 77, the MERLIN robot 95 understands AR Basic & the IBM Layup robot 110 understands AML. The PLM 86 code of the Intel processor must be recompiled to transmit control to the various elements. Ada is used for the Data Generation software in the VAX computer.

Before a supervisor 26 directs its dedicated robot or machine to perform a task, the manager 24 must be consulted as to the availability of the necessary equipment and the timelines of the task. In this way, the manager 24 oversees the complete operation, keeping track of the current status of assembly and ordering the steps which will lead to completion of the assembly.

System specifics or assembly changes can be entered with the input devices to specify, for example, the location of blocks and/or gates on the form board 115, specific end configurations, and other data. The input devices also perform switching to begin assembly or to override the manager 24.

The MERLIN robot is trained by securing a contact probe in the manipulator and by using the probe to define fixed locations in space for the manipulator. The rack of the Wire Terminating subsystem has a front opening which defines a reference plane from which the robot can orient itself in moving between the several terminating devices. Similarly, the framework 104 of the layup system defines a plane for the Queuing subsystem.

While preferred embodiments of the invention have been shown and described, those skilled in the art will recognize alterations, modifications, and variations which might be made without departing from the inventive concept. The claims, accordingly, should be construed broadly to cover the invention and its reasonable range of equivalents. The description is meant to illustrate the invention, and should not be interpreted to limit the invention unless such limitation is necessary in view of the pertinent prior art.

We claim:

1. A wire harness assembly system using robots to cut wires, to automatically configure the pre-cut wires, and to assemble the pre-configured wires into the desired wire harness, comprising:
    (a) a wire preparation subsystem for selecting a predetermined wire and for cutting that wire to a predetermined length;
    (b) a wire reeling subsystem, including a movable table having at least one wire canister holder and a wire canister for holding the pre-cut wire from the wire preparation subsystem;
    (c) a wire terminating subsystem for configuring the ends of the wire within the canister;
    (d) a wire queuing subsystem for holding the canister in a bay between the wire terminating subsystem and a layup subsystem;
    (e) a layup subsystem including a layup robot which travels over a form board to position the wire in the canister into the predetermined pattern of the wire harness;
    (f) a transport robot to move a loaded canister from the wire reeling subsystem to the wire terminating subsystem, and then to the queuing subsystem, and to move an empty canister from the queuing subsystem to the wire reeling subsystem; and
    (g) logic control means associated with each of the subsystems for controlling automated assembly of a wire harness into a predetermined configuration.

2. The system of claim 1 wherein the wire preparation subsystem includes means for marking each wire selected and cut in the subsystem.

3. The system of claim 1 wherein the wire terminating subsystem includes an automatic wire stripper, a wire twister, and a contact crimper.

4. The system of claim 1 wherein the wire queuing subsystem includes at least two bays, each bay being adapted for receiving a canister and including means for revolving from a first position where the transport robot can acquire or deposit a canister in the bay and a second position where the layup robot can acquire or deposit a canister.

5. The system of claim 1 wherein the logic control means includes a master system computer for transmitting commands regarding layup and assembly of the wire harness to the subsystems, wherein the several subsystems are slaves to the master computer.

6. The system of claim 1 wherein the layup robot travels in a predetermined plane above the form board and guides the laying of each wire segment into the harness with a plurality of tools positioned on the form board at predetermined locations.

7. The system of claim 1 wherein the wire reeling subsystem includes at least two wire canister holders, one holder positioning a canister for loading wire segments from the wire preparation subsystem and the second holder positioning a loaded canister for a transport robot which conveys the canister through the wire terminating subsystem.

8. The system of claim 1 wherein the wire terminating subsystem includes a transport robot and a plurality of automated configuring devices positioned in at least one rack accessible by the transport robot.

9. The system of claim 2 wherein the means for marking includes a laser capable of printing identification markings on the wire.

10. A method for making wire harnesses, comprising the steps of:
    a. selecting a wire of predetermined size;
    b. cutting the wire to a predetermined length;
    c. winding the cut wire onto a transporting canister that locates the ends of the wire in accessible, predetermined locations;
    d. transporting the canister with a robot;
    e. configuring the ends of the wire in the canister;
    f. delivering the canister that has the configured wire to a lay-up robot;
    g. unwinding the configured wire from the canister by moving the canister with the robot over a formboard to position the wire into a wire harness; and
    h. repeating steps (a) through (g) to complete the harness.

11. The method of claim 10 further comprising the step of marking the wire with printing identification marks prior to winding the wire onto the canister.

12. The method of claim 11 wherein the step of marking uses a laser to print on the wire.

* * * * *